United States Patent [19]

Shaw et al.

[11] 3,917,865

[45] Nov. 4, 1975

[54] CO-DISTILLATION METHOD FOR RECOVERING VOLATILE FLAVOR COMPOUNDS FROM CITRUS ESSENCE OILS

[75] Inventors: Philip E. Shaw, Lakeland; Richard L. Coleman, Winter Haven, both of Fla.

[73] Assignee: The United States of America as represented by the Secretary of Agriculture, Washington, D.C.

[22] Filed: Jan. 28, 1974

[21] Appl. No.: 437,095

[52] U.S. Cl. ............... 426/424; 426/386; 426/429; 426/492
[51] Int. Cl.² ............................................. A23L 2/30
[58] Field of Search .......... 426/386, 492, 493, 494, 426/429, 487, 424, 429

[56] References Cited
UNITED STATES PATENTS

| | | | |
|---|---|---|---|
| 2,450,097 | 9/1948 | Singleton | 426/492 X |
| 2,641,550 | 6/1953 | Dykstra et al. | 426/492 X |
| 3,695,897 | 10/1972 | Uchida et al. | 426/429 |
| 3,787,593 | 1/1974 | Atkins et al. | 426/386 X |

OTHER PUBLICATIONS

Recovery of Essence from Florida Orange Juice, Food Tech., 1953, Vol. VII, No. 8, pp. 332–336, by Morgan et al.

*Primary Examiner*—Frank W. Lutter
*Assistant Examiner*—N. Greenblum
*Attorney, Agent, or Firm*—M. Howard Silverstein; Max D. Hensley

[57] ABSTRACT

A process for recovering volatile flavor compounds from citrus essence oils is disclosed. The concentrated flavor fraction is both anhydrous and water-soluble and is useful in imparting to citrus juices and other beverages a "fresh" flavoring without increasing oil or water content of these products.

5 Claims, No Drawings

CO-DISTILLATION METHOD FOR RECOVERING VOLATILE FLAVOR COMPOUNDS FROM CITRUS ESSENCE OILS

This invention relates to a new process for separating volatile flavor compounds from citrus essence oils in a concentrated, water-soluble form suitable for flavoring citrus products.

BACKGROUND OF THE INVENTION

Citrus essence oils cannot be used with dehydrated materials or highly concentrated materials because the essence oils contain so much d-limonene which contributes relatively little to flavor but is highly susceptible to oxidative reactions causing flavor deterioration. A method which would separate all of the other principal flavor components from the bulk of the d-limonene would enable the preparation of a highly concentrated flavor material which could be used in dehydrated orange juice and other similar products and circumvent the problems of d-limonene. Co-distillation with alcohol appears to provide a product with these desirable properties.

THE PRIOR ART

When vapors from the first stage of an evaporator used to produce frozen concentrated citrus juices are condensed in an essence recovery unit and separated in an oil separator an oil fraction (essence oil) and an aqueous fraction (aqueous essence) are obtained (see U.S. Pat. No. 3,118,776). Addition of aqueous citrus essence or essence oil to processed citrus products is currently used to impart "fresh" citrus flavor to these products. Aqueous essence contains at least 85% water, and so its use is limited in dehydrated citrus products, such as instant orange juice powder where small increases in water content adversely offset storage stability [see R. E. Berry et al. article in Food Tech. 20, pp. 177–178 (1965)]. Essence oil is at least 95% d-limonene, and is water-insoluble (Coleman and Shaw determined that in 1971). Thus, its use is limited both because its water-insolubility makes it difficult to blend in single strength citrus juices and because its high d-limonene content can cause undesirable flavors. Essence oil is also unstable because of its high d-limonene content and it must either be blended with cold pressed citrus oil or treated with antioxidants to be stabilized for storage.

OBJECTIVES OF THE PRESENT INVENTION

The main object of the present invention is to provide a method of recovering volatile flavor compounds from citrus essence oils.

A second object of the present invention is to provide a concentrated flavor fraction from essence oil which is both anhydrous and water-soluble.

A third object of the present invention is to provide a means of imparting to citrus juices, drinks, concentrates, and the like beverages a "fresh" flavoring without increasing the oil or water content of these products.

HOW THE OBJECTIVES OF THE PRESENT INVENTION ARE ACHIEVED

The present invention provides a new process for obtaining a concentrated, water-soluble, anhydrous flavor fraction from citrus distilled essence oils that is suitable for flavoring citrus products. Briefly, the process consists of distilling essence oil that contains several percent added ethanol at low pressure and ambient temperature and condensing the most volatile several percent of the distillate. This volatile distillate has been shown by analysis to be a concentrated solution of the volatile components of essence oil that are responsible for the "fresh fruit," essence-like, character of the oil. (See Table I).

TABLE 1

VOLATILES FROM ETHANOL-TREATED ORANGE ESSENCE OIL

| Compound | Area % 20M |
| --- | --- |
| Hexane | 0.03 |
| Acetaldehyde + Heptane | 0.01 |
| Acetone | 0.03 |
| Ethyl acetate | 0.6 |
| Ethanol | 78.5 |
| Methyl butyrate + Diacetyl | 0.01 |
| Ethyl vinyl ketone | 0.01 |
| Ethyl butyrate + α-Pinene | 0.6 |
| Hexanal | 0.04 |
| Sabinene | 0.15 |
| Myrcene | 0.3 |
| D-Limonene | 19.6 |
| Octanal | 0.1 |

This volatile fraction was evaluated in citrus juice by a panel of experts experienced in detecting the fresh flavor contribution made by essence added to citrus juices. The panel judged this volatile fraction to contribute essence-like flavor at its approximate threshold level.

The following examples are provided to illustrate the invention and should not be construed as limiting the invention in any manner whatever.

EXAMPLES

In order to obtain a water-soluble essence-like flavor fraction from essence oil, absolute ethanol is added to the essence oil prior to distillation. Thus, 7.25 grams of absolute ethanol was added to 390 grams (460 ml) of Valencia orange essence oil and the resulting solution was distilled in a rotary evaporator to which a condenser cooled with chilled (9°C) water and two liquid nitrogen traps were attached in series.

Distillation at 2.7 to 3.3 mm of mercury and a bath temperature of 26° to 33°C was continued until condensate began to appear on the chilled water condenser. This took about from 5 to 10 minutes. At this point the first liquid nitrogen trap contained 8.56 grams of material (essence oil volatiles, about 2.2% of the distilled solution). The second liquid nitrogen trap and chilled water condenser contained no distillate. Liquid nitrogen trap condensate was analyzed by gas liquid chromatography on both polar and nonpolar columns and was shown to be mostly ethanol and to contain many of the compounds previously shown responsible for the essence-like flavor on the oil. Table I lists the compounds identified.

Taste tests were conducted using single-strength orange juice for the control samples prepared from a high quality commercial concentrate which contained cold-pressed peel oil but which contained no aqueous essence.

Samples of orange essence oil water-soluble volatiles were added to 1200 ml of a single strength orange juice prepared from the concentrate in decreasing increments, until the flavor threshold was established (approximately 17 ppm).

In another series of taste tests tangerine essence oil volatiles at the approximate threshold added to orange juice were compared with similar juice without these volatiles in a paired comparison test, described by M. N. Boggs in Advances in Food Research, Vol. 2, page 222, and bearing the title "Analysis of Food by Sensory Difference Tests." In 12 judgements the sample containing the volatile fraction was selected as having more "essence-like" character.

CERTAIN MODIFICATIONS THAT CAN BE EMPLOYED

Similar treatments could be applied to other commercially available citrus essence oils such as lemon, lime, and grapefruit. The ethanol content of the essence oil could be varied, depending on the strength of the essence oil concentrate desired. Other low-boiling solvents could be used with comparable effects, such as acetone, methanol, or one of the nontoxic fluorinated hydrocarbons (Freons).

We claim:

1. A process for obtaining a volatile, water-soluble concentrated flavor fraction from citrus essence oil, the process comprising:
    a. forming an anhydrous solution of said essence oil and a low boiling solvent selected from the group consisting of acetone, methanol, ethanol and a nontoxic fluorinated hydrocarbon;
    b. distilling the solution at about 2.7 to 3.3 millimeters of mercury and about 26° to 33° C.; and
    c. recovering the most volatile about 2.2% by weight of the solution.

2. The process of claim 1 wherein the essence oil is obtained from citrus selected from the group consisting of grapefruit, tangerine, lemon and lime.

3. The process of claim 1 wherein the solvent is acetone.

4. The process of claim 1 wherein the solvent is a nontoxic fluorinated hydrocarbon.

5. The process of claim 1 wherein the solvent is ethanol at a concentration of about 1.8% by weight in the solution of step (a).

* * * * *